Feb. 18, 1941.  L. A. BODE  2,232,161
ENGINE SPEED CONTROL
Filed April 24, 1939
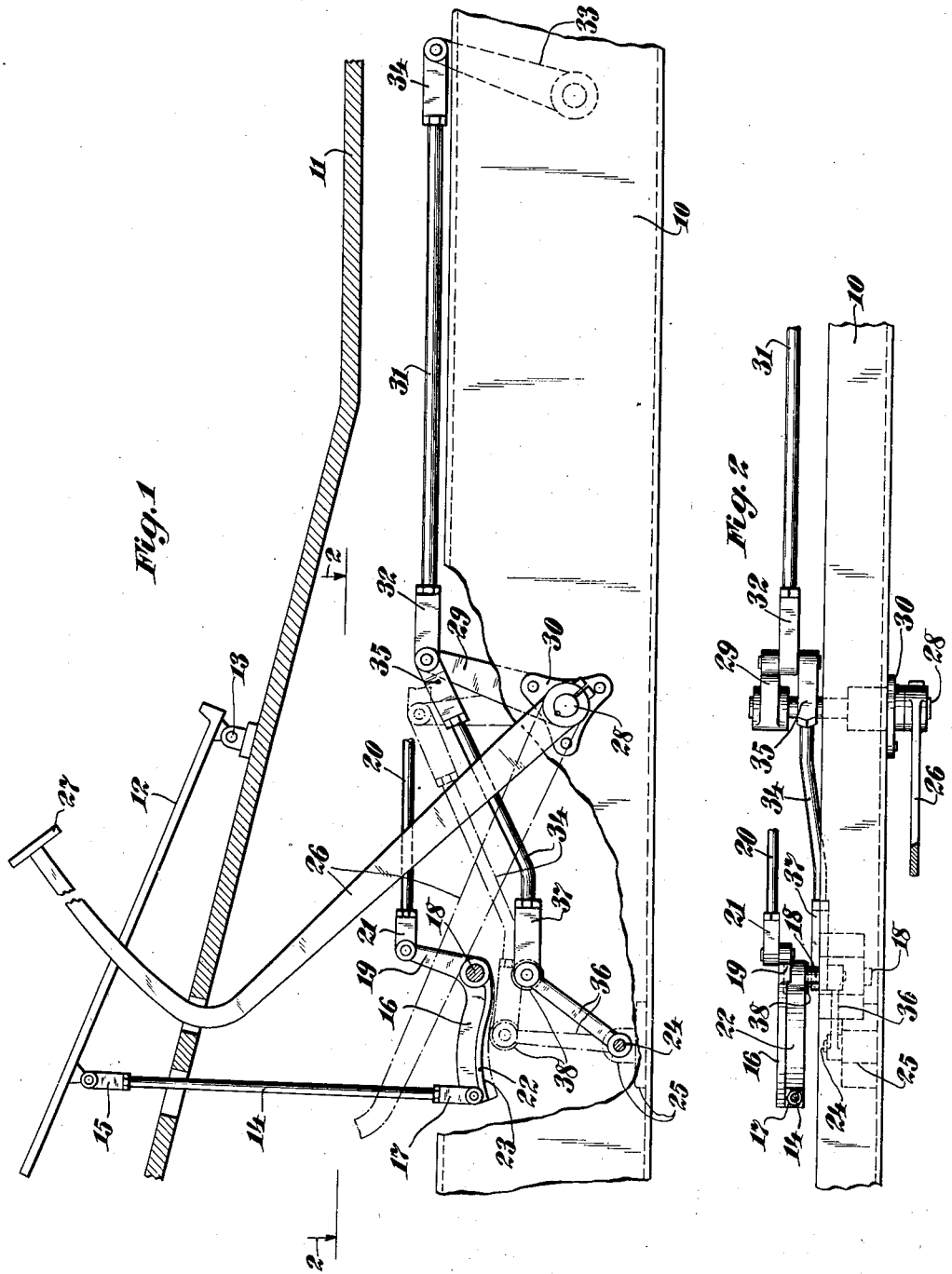
INVENTOR.
Louis A. Bode,
BY
ATTORNEYS Patented Feb. 18, 1941

2,232,161

UNITED STATES PATENT OFFICE 2,232,161

ENGINE SPEED CONTROL

Louis A. Bode, North Pelham, N. Y., assignor to Mack Manufacturing Corporation, Long Island City, N. Y., a corporation of Delaware Application April 24, 1939, Serial No. 269,708

7 Claims. (Cl. 192—.01)

The present invention relates to control mechanisms for motor vehicles and, more particularly, to control mechanisms for vehicle driving mechanisms of the internal combustion type in which clutch and throttle control means are provided.

A common difficulty encountered in motor vehicle operation and giving rise to difficult and expensive maintenance problems is the difficulty resulting from the burning of clutch linings. The reason for this is that drivers frequently run the engine at excessive speeds during starting and while shifting gears. This is particularly true in bus operations where many stops are made and where the driver desires to accelerate the bus as quickly as possible after each stop.

In order to accomplish this quick acceleration when the bus is loaded, the driver frequently brings the engine up to governor speed and allows the clutch to slip until the bus has reached a desired speed, thus taking advantage of the inertia of the engine, as well as the increased horsepower developed at the higher engine speed. Not only does this impair the life of the clutch but it imposes added strains on other parts of the driving mechanism. Further difficulty resides in the fact that the driver frequently allows his foot to rest on the foot pedal, particularly in bus operation where the number of clutch operations is greater than in other types of operation. Quite naturally, the driver finds it easier to rest his foot on the clutch pedal than to remove it after each acceleration. This throws an added strain on the clutch mechanism and further shortens the life thereof.

An object of the present invention is to provide a control mechanism by means of which the engine speed is effectively controlled during engagement of the clutch.

A further object of the invention is to provide a control mechanism of the above character which affords an effective interlock between the accelerator pedal and the throttle operating mechanism actuated thereby, and the clutch pedal and clutch actuating mechanism actuated thereby.

A further object of the invention is to provide a simple and effective mechanism by means of which the engine speed is restricted to a value beneath a pre-determined maximum until the clutch is fully engaged, removing such restricting force after engagement of the clutch to permit the engine speed to be increased as in normal operation.

A further object of the invention is to provide a control mechanism of the above character wherein means is provided for reducing the engine speed to a desired value when the clutch pedal is depressed.

Further objects of the invention will appear as it is described in greater detail in connection with the accompanying drawing, wherein:

Fig. 1 is a view in side elevation, showing a control mechanism constructed in accordance with the present invention, parts of the vehicle chassis being broken away and in section to facilitate the description.

Fig. 2 is a view in section taken on the line 2—2 of Fig. 1 and looking in the direction of the arrows, the view providing a plan layout of the essential parts of the control mechanism.

Referring to the above drawing, the side frame member of a motor vehicle is illustrated at 10, the chassis of which it is a part, including flooring 11 upon which an accelerator pedal 12 is hinged as shown at 13. The accelerator pedal is connected to a rod 14 through a clevis 15, the rod 14 being connected to the arm 16 of a bell crank lever by means of a clevis 17. The bell crank lever 16 is journalled on a stud 18 which is carried about the frame member 10 and is provided with a second arm 19 connected to a throttle operating rod 20 by means of a clevis 21. The rod 20 may actuate the throttle in any well known fashion and the present invention is not concerned with the details of such mechanism.

It will be observed that the lower side of the lever arm 16 is formed with a curved plate 22 forming a cam surface 23, the curvature of the cam surface being in an arc the center of which is the center of a shaft 24 which may be formed upon a suitable bracket 25, secured to the frame 10. The function of the shaft 24 will be described in further detail presently.

The usual clutch pedal is illustrated at 26, being provided with a foot plate 27 and keyed to a shaft 28 to which an arm 29 is also keyed. A bracket 30 may be provided for mounting the rock shaft 28 upon the frame 10 and the arm 29 actuates rod 31 through a clevis 32 in order that the motion of the clutch pedal 26 may be transmitted to an arm 33 which is connected to the rod 31 by means of a clevis 34. The arm 33 actuates the clutch throw-out fork in any desired way, the present invention not being concerned with the details of such clutch operating mechanism.

The arm 29 is also connected to a rod 34 by means of a clevis 35, the rod 34 being connected to an arm 36 through a clevis 37. The lower end of arm 36 is journalled on the shaft 24 and the upper end is provided with a roller 38 which is adapted to engage the cam surface 23 and serve as the follower thereof.

It will be observed that, when the clutch pedal 26 is fully depressed, the arm 36 will be moved into the position shown in dot-and-dash lines in Fig. 1. When in this position, the accelerator pedal can only be depressed a small amount, the cam surface 23 engaging the roller 38 to prevent further movement thereof. This prevents the engine speed from being increased while the clutch pedal is in the "down" position and thus avoids the so-called "riding the clutch" which results when the operator partially depresses the clutch pedal while the engine is operating at a relatively high speed. If the clutch pedal is depressed while the accelerator pedal is down, the roller 38 will engage the cam surface 23 to force the accelerator pedal up and thus automatically decrease the engine speed to a desired amount.

In operation, the operator will depress the clutch pedal 26 to effect the transmission gear change and will then allow the clutch pedal to come up slowly while pressing the accelerator pedal down. Such operation cannot be accomplished in an injurious fashion when the present invention is used because the engine speed cannot be increased beyond a pre-determined amount until the clutch pedal 26 has been returned to its "up" position. In designing and constructing the mechanism, the parts may be formed so that any desired engine speed may be maintained during clutch operation, the desired speeds being such that burning of the clutch facings is avoided. It has been found that such desired engine speed is between 1000 and 1400 revolutions per minute.

While the invention has been described with reference to the specific structure shown in the accompanying drawing, it is not to be limited save as defined in the appended claims.

I claim:

1. Speed control mechanism for internal combustion engines comprising a clutch pedal and mechanism operated thereby for actuating a clutch, an accelerator pedal and means operated thereby to actuate the engine throttle, the throttle actuating means including a bell crank lever formed with a cam surface, and means operated by the clutch actuating mechanism to engage the cam surface and prevent further operation of the throttle upon operation of the clutch actuating mechanism.

2. Speed control mechanism for internal combustion engines comprising a clutch pedal and mechanism operated thereby for actuating a clutch, an arm pivoted at one end and having a link connecting the same to the clutch actuating mechanism, and an accelerator pedal and means operated thereby to actuate the engine throttle, the throttle actuating means including a bell crank lever formed with a cam surface and adapted to be engaged by the free end of the pivoted arm upon actuation of the accelerator pedal when the clutch actuating means is operated to prevent further increase in engine speed when the clutch pedal is operated.

3. Speed control mechanism for internal combustion engines comprising a clutch pedal and mechanism operated thereby for actuating a clutch, an arm pivoted at one end and having a link connecting the same to the clutch actuating mechanism, a roller journalled on the free end of the arm and an accelerator pedal and means operated thereby to actuate the engine throttle, the throttle actuating means including a bell crank lever formed with a cam surface curved on a radius about the pivot point of the arm and adapted to be engaged by the roller on the free end of the pivoted arm upon actuation of the accelerator pedal when the clutch actuating means is operated to prevent further increase in engine speed when the clutch pedal is operated.

4. Speed control mechanism for internal combustion engines comprising a clutch pedal and mechanism operated thereby for actuating the clutch, pivoted means having a link connecting one end thereof to the clutch actuating mechanism, an accelerator pedal and means operated thereby to actuate the engine throttle, the throttle actuating means including a lever formed with a cam surface adapted to be engaged by the said pivoted means upon actuation of the accelerator pedal when the clutch actuating means is operated, to prevent further increase in engine speed when the clutch pedal is operated.

5. Speed control mechanism for internal combustion engines comprising a clutch pedal, means operated thereby for actuating a clutch, an accelerator pedal, means operated thereby for actuating the engine throttle, means movable to form an obstruction to movement of said accelerator pedal from substantially idling position, said obstruction being of a character which substantially will not transmit force from the accelerator pedal to the clutch pedal when the clutch is disengaged, and means responsive to movement of the clutch pedal for rendering said last named means effective when the clutch is disengaged.

6. Speed control mechanism for internal combustion engines comprising a clutch pedal, means operated thereby for actuating a clutch, an accelerator pedal, means operated thereby for actuating the engine throttle, means adapted to be moved into engagement with the throttle actuating means to form an obstruction to movement of the throttle from substantially idling position, said obstruction being of a character which substantially will not transmit force from the accelerator pedal to the clutch pedal when the clutch is disengaged, and means responsive to movement of the clutch pedal for moving said means into engagement with the throttle actuating means when the clutch is disengaged.

7. Speed control mechanism for internal combustion engines comprising a clutch pedal, means operated thereby for actuating a clutch, an accelerator pedal, means operated thereby for actuating the engine throttle, means responsive to movement of the clutch pedal for returning said accelerator pedal to substantially idling position during disengaging movement of the clutch pedal, said means forming an obstruction to movement of said accelerator pedal from substantially idling position when the clutch is disengaged, said obstruction being of the character which will not transmit force from the accelerator pedal to the clutch pedal when the clutch is disengaged.

LOUIS A. BODE.